United States Patent [19]

Graham

[11] Patent Number: 4,633,160
[45] Date of Patent: Dec. 30, 1986

[54] SELF-EXCITED ALTERNATOR

[75] Inventor: Gary Graham, Adelaide, Australia

[73] Assignee: U.S. Philips Corporation, New York, N.Y.

[21] Appl. No.: 694,726

[22] Filed: Jan. 25, 1985

[30] Foreign Application Priority Data

Jan. 27, 1984 [AU] Australia ............................ PG3374

[51] Int. Cl.$^4$ ............................................ H02P 9/10
[52] U.S. Cl. ...................................... 322/20; 322/63; 322/64; 322/66; 322/28
[58] Field of Search ...................... 322/20, 21, 28, 63, 322/64, 66

[56] References Cited

U.S. PATENT DOCUMENTS

| 3,189,814 | 6/1965 | Rosenberry et al. | 322/28 X |
| 3,374,423 | 3/1968 | Hemmenway | 322/28 X |
| 3,534,228 | 10/1970 | Hyvarinen et al. | 322/28 X |
| 3,713,016 | 1/1973 | Lehnhoff | 322/28 |
| 3,758,843 | 9/1973 | Ishizaki et al. | 322/28 X |
| 3,863,137 | 1/1975 | Mishima et al. | 322/28 X |
| 4,383,215 | 5/1983 | Frister | 322/28 X |
| 4,442,396 | 4/1984 | Hucker | 322/28 X |

Primary Examiner—William B. Perkey
Attorney, Agent, or Firm—David R. Treacy

[57] ABSTRACT

A self-excited brushless alternator having a rotating field excited by an alternating current exciter whose armature rotates with the field winding of the alternator and is permanently connected to that winding by a rotating field rectifier. To obtain reliable regulation over a wind range of load and power factors, at least one exciter stator primary winding is magnetically coupled to at least one exciter rotator secondary winding which is connected by the rectifier to the main field. Primary excitation direct current for the exciter is derived by a magnetic coupling from a rotary auxiliary magnetic field produced by a feedback winding connected in series with the main field winding and rotating therewith. Preferably, current paths for the exciter primary excitation are different during and after build-up.

14 Claims, 2 Drawing Figures

SELF-EXCITED ALTERNATOR

BACKGROUND OF THE INVENTION

The present invention relates to self-excited alternators of the brushless type, having a rotating field which is excited by an alternating current exciter whose rotating armature is mounted to rotate with the rotating field winding of the alternator and is permanently connected to the field winding of the alternator via field rectifier means also mounted to rotate with the field winding. Such a machine is referred to herein as a brushless alternator.

When a brushless alternator is running at substantially constant speed and is generating power at unity or lagging power factor, the terminal voltage of the alternator will fall with increasing load. If the terminal voltage is to be regulated so as to be kept constant at constant or slightly falling speed under load, then the direct current excitation of the field winding must be increased either with increasing load at a given power factor, or with decreasing power factor at a given load, or if both conditions occur simultaneously.

Known voltage regulation systems for brushless alternators are based upon one or the other of the two systems described in the following and referred to as "System A" and "System B".

In System A, direct current excitation requirements are controlled in response to the brushless alternator load by means of a feedback system employing the alternator terminal voltage as the only source of information indicating load change.

With System A, regulation is performed by closed loop feedback employing either a magnetic amplifier or electronic means such as SCR's or transistors capable of handling the large power requirements of transient overload excitation conditions.

Nowadays, the use of magnetic amplifiers is virtually obsolete and here it is only necessary to consider electronically controlled regulators. Electronically controlled regulators operating according to System A sense the terminal voltage which may vary with speed, load or power factor changes and, by closed loop feedback control of direct current excitation, the alternator terminal voltage is continuously restored to its correct level. Regulators of this type have the advantage of being very accurate in their steady state voltage control and in their low power consumption, but suffer from the disadvantages listed as follows:

(i) Speed of response is hampered by the magnetic response time of the exciter in addition to that of the main alternator, particularly on the removal of load or lagging power factor. This results in an over supply of excitation which prolongs and exaggerates terminal voltage overshoot.

(ii) Electronic regulation systems will not always operate reliably under adverse conditions of extreme temperatures (for example between $-15°$ C. to $+50°$ C.) and/or high humidity and/or salt-laden or dust-laden atmosphere, for instance in atmosphere laden with conductive ore dust such as may be encountered in mining sites. In this respect, brushless alternators are frequently put to use in locations where extreme operating conditions prevail. Performance reliability is particularly important in such locations where it is frequently difficult to obtain trained personnel capable of servicing electronic equipment and where the brushless alternator concerned is the only means of obtaining electric power supplied at that location.

(iii) Failure of the regulator generally requires immediate shut-down of the alternator to prevent the possibility of winding failure or failure of the connected load.

(iv) Unless used in conjunction with additional circuitry or some external excitation supply system, electronic regulators have poorer overload characteristics than magnetically coupled systems.

Within System B, regulation is achieved by magnetic feedback in which excitation voltage, and thus direct current excitation, are controlled in accordance with the rectified resultant of a voltage component dependent upon the alternator terminal voltage and a voltage component dependent upon alternator load current. With this system it is necessary to provide additional means for limiting the no-load terminal voltage of the alternator as well as means compensating for minor variations of temperature and/or speed variations.

One known voltage regulation system of this kind is the compounding transformer regulator which is frequently incorrectly referred to as a "saturable reactor regulator".

With the compounding transformer regulator, the primary winding of the compounding transformer is connected in series with the alternator load across the alternator terminals and the alternator terminal voltage is applied via the secondary winding of the transformer across the series combination of a rectifier and the excitation field winding of the alternator. The resistance of the excitation winding is such as to limit the direct excitation current to the value necessary for correct no-load terminal voltage. The magnitude and phase of the transformer secondary voltage is proportional to the alternator load current passing through its primary and the transformer secondary voltage combines vectorially with the alternator terminal voltage to give a resultant voltage which is rectified and applied across the exciter field winding.

System B regulators are rugged and reliable in operation and are easy to service. In addition, they have rapid response to load changes because the time constants of each magnetic section are interdependent and they provide certain protection for the alternator under overload conditions. Compared with System A regulators, they have improved characteristics for motor starting. However, System B regulators have the following disadvantages:

(i) They are large, heavy and expensive and must be mounted externally of the brushless alternator per se.

(ii) They have poorer regulation than System A regulators owing to the imprecise compensation of load current, power factor, resistance changes in the exciter and main field windings, and also speed variations.

(iii) Generally, they consume substantial power with the net result that alternator efficiency is noticeably reduced.

SUMMARY OF THE INVENTION

An object of the invention is to provide a self-regulating brushless alternator having reliable regulation over wide variation of alternator load and power factor.

A brushless alternator in accordance with the present invention has an exciter with one or more exciter stator primary windings and one or more exciter rotor secondary windings connected via rotary field rectifier means to the rotary main field winding of the alternator, primary excitation direct current for the exciter being derived, via magnetic coupling, from a rotary auxiliary magnetic field produced by a feedback winding connected in series with the main field winding and mounted to rotate therewith.

In one form of brushless alternator in accordance with the invention, the primary excitation current is derived by rectification of the current induced into an auxiliary stator secondary winding located within the auxiliary magnetic field, the magnetic circuit coupling the rotary feedback winding with the auxiliary stator secondary winding being common with that of the exciter. In another form, the magnetic circuit coupling the rotary feedback winding with the auxiliary stator secondary winding is separate from that of the exciter. However, within the scope of the invention, other forms of circuitry and of magnetic coupling are possible via which direct excitation current may be derived from the rotary auxiliary magnetic field.

In a brushless alternator in accordance with the invention, variation of the alternator load or of the power factor of the alternator load instantaneously produces a corresponding variation of the rotary main field winding current and thus a corresponding variation of the current flow in the rotary feedback winding. Consequently, the primary excitation direct current varies in accordance with alternator load and power factor variations.

The feedback system via which the primary excitation current is derived from the auxiliary field produced by the said rotary feedback winding may be proportioned so that a small excess of available primary excitation current is produced to ensure exciter voltage and alternator terminal voltage build-up. When so proportioned, a cancellation means sensitive to the alternator terminal voltage is required for cancelling the effects of excess excitation above a predetermined terminal voltage. Such cancellation means are generally known and may take any one of the several forms. In one form of cancellation means there is provided a source of counteracting current and a monitoring means for monitoring an output voltage of the brushless alternator so that in response to the monitored output voltage exceeding a predetermined level, a counteracting current is supplied to the exciter in a direction opposing the effect of the primary excitation current.

Alternatively, the feedback system, via which the primary excitation current is derived from the auxiliary field produced by the rotary feedback winding, may be proportioned so that the magnitude of primary excitation current produced thereby is less than the magnitude required for alternator voltage build-up; and a current reinforcing means sensitive to an output voltage of the alternator is provided for supplying current reinforcing the effects of the primary excitation current below a pre-determined alternator voltage, with resultant alternator voltage build-up. Again, such reinforcing means may take any one of several forms. One form of current reinforcing means includes a source of supplementary current and a monitoring means for monitoring an output voltage of the alternator so that in response to the monitored output voltage being less than a pre-determined level, a supplementary current is supplied to the exciter in a direction reinforcing the effects of the primary excitation current.

In a brushless alternator in accordance with the invention, it may be desirable to provide a second rotary feedback winding which is fixed relative to the first mentioned feedback winding and located in proximity thereto so that the magnetic field produced by the second feedback winding is superimposed upon the auxiliary magnetic field, current proportional to the main field voltage being supplied to the second feedback winding thereby providing compensation for resistance changes of the alternator main field winding resulting from temperature variation.

BRIEF DESCRIPTION OF THE DRAWING

The invention will now be described with reference to the accompanying drawings, in which.

DESCRIPTION OF THE PREFERRED EMBODIMENTS

Figure 1:
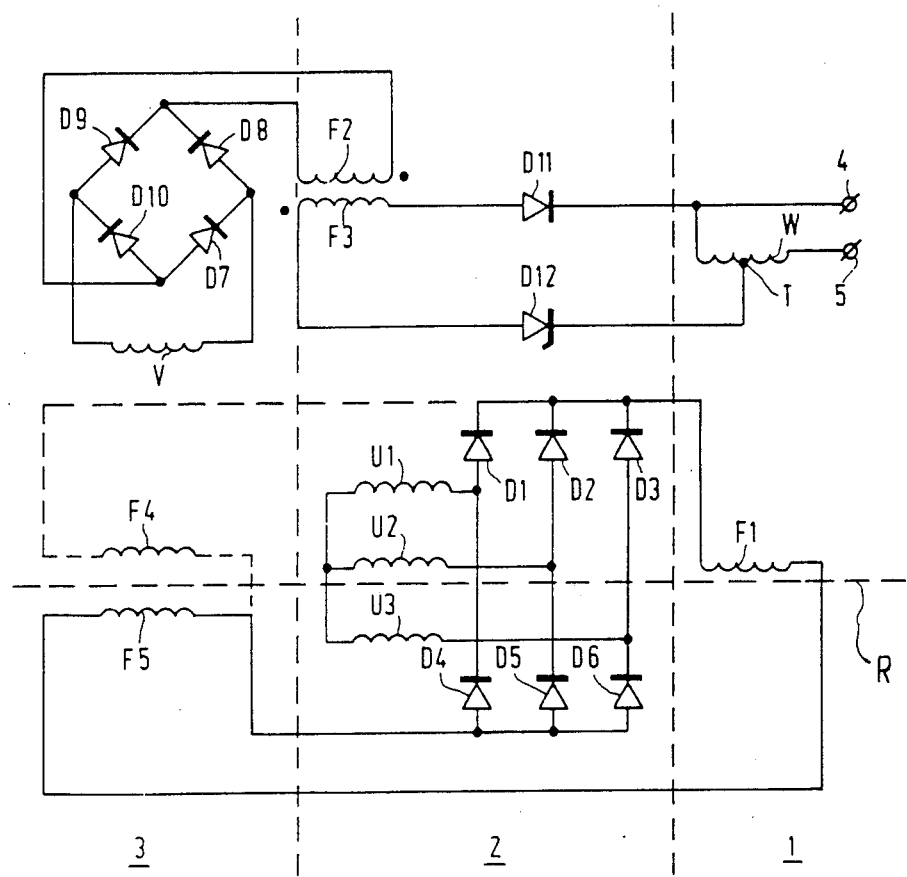
FIG. 1 is a diagrammatic representation of a brushless alternator embodying the invention.

The single-phase brushless alternator illustrated schematically in FIG. 1 comprises an output section 1, an exciter section 2 and a feedback alternator section 3 which are accommodated in an alternator housing which is not shown in the Figure. The main field winding F1, the three exciter secondary windings U1, U2 and U3 and the feedback alternator winding F5 are all mounted on a rotor constructed so as to be rotated from a driving source about an axis within the housing and symbolized by the dashed line R. The rotor on which the windings F1, U1, U2, U3 and F5 are mounted has three separate sets of laminations accommodating the respective windings so that the main field winding F1 is wound one set of laminations associated with the output section 1, the exciter windings U1, U2 and U3 are wound on another set of laminations associated with the exciter section 2 and the feedback winding F5 is wound on the remaining set of laminations associated with the feedback alternator section 3. Stationary windings W, F2, F3 and V are respectively located and disposed within the alternator housing in a conventional manner so that the winding W functions as a single-phase output winding magnetically coupled with the main field winding F1, the windings F2 and F3 function as exciter primary windings magnetically coupled with the exciter secondary windings U1, U2 and U3 and the winding V functions as a feedback secondary winding magnetically coupled with the feedback primary winding F5.

The exciter section 2 operates as a conventional generator wherein a primary magnetic field set up by the windings F2 and F3 results in generation of voltages in the three-phase secondary windings U1, U2 and U3 which are connected to the main field winding F1 via the rotary three-phase rectifier system constituted by the rectifiers D1, D2, D3, D4, D5 and D6. The primary winding F5 of the feedback alternator section 3 is connected in series with the main field winding F1 across the output of the rectifier system constituted by the rectifiers D1–D6. By means of a full wave rectifier system constituted by the rectifiers D7, D8, D9 and D10, the secondary winding V of the feedback alternator section 3 is connected to supply excitation current to the exciter primary winding F2.

Alternator output terminals 4 and 5 are connected to opposite ends of the single-phase output winding W and the end of the output winding W remote from the terminal 5 is connected via the diode D11 to one end of the exciter primary winding F3. A tapping T provided on the winding W is connected via a zener diode D12 to the other end of the exciter primary winding F3 so that when the voltage produced between the terminal 4 and the tapping T is of sufficient magnitude for the zener voltage of the diode D12 to be exceeded, a counteracting current is produced in the exciter primary winding F3.

Operation of the brushless alternator of FIG. 1 is as follows. Owing to the residual magnetism of stationary parts of the alternator, when the alternator rotor is driven small voltages are generated across the windings U1, U2 and U3 which cause a small rectified current to flow in the windings F1 and F5. Current through the winding F5 produces a magnetic field Mr which is fixed relative to the rotor. As the magnetic field Mr moves relative to the stationary winding V, a voltage directly proportional to the level of the current in the winding F5 is generated across the winding V. The alternating voltage developed across the winding V is fed to the rectifier bridge composed of the rectifiers D7–D10 and the rectified output of the bridge is supplied as excitation current to the exciter primary winding F2.

Movement of the rotor within the exciter field produced by current flow in the winding F2 results in increased voltages being produced across the respective windings U1, U2 and U3 and rectification of these voltages by the rectification system constituted by the rectifiers D1–D6 causes a flow of current in the main field winding F1 and also in the feedback winding F5. The magnetic flux due to the flow of rectified current in the rotary main field winding F1 causes an alternating voltage to be produced across the single phase output winding W and the simultaneous flow of rectified current through the winding F5 further increases the strength of the magnetic field Mr.

The winding V is designed so that its output voltage is slightly in excess of the voltage required to maintain the excitation current in the winding F2. In this way, a build-up of excitation current and of the alternator terminal voltage is ensured.

It will be appreciated that the strength of the stationary magnetic field of the exciter section 2 of the alternator determines the level of the voltages generated across the windings U1, U2 and U3 and hence determines the level of the rectified voltage developed across the windings F1 and F5 and the level of the alternating output voltage produced across the terminals 4 and 5.

The winding F3, the diode D11, the zener diode D12 and the associated circuitry function as a monitoring circuit provided for the purpose of limiting the alternator terminal voltage build-up to a predetermined level. So long as the voltage produced between the terminal 4 and the tapping T of the winding W is insufficient for the zener voltage of the zener diode D12 to be exceeded, there is no current flow in the winding F3. However, when the zener voltage of the diode D12 is exceeded, the resultant flow of current in the primary exciter winding F3 is in a direction so as to oppose the effect of the flow of excitation current in the winding F2. Accordingly, the maximum level of the alternator terminal voltage developed across the terminals 4 and 5 is governed inter alia by the characteristics of the zener diode D12 and of the winding F3. Those characteristics should be chosen to suit the terminal voltage required.

The feedback system from the output section 1 to the exciter primary winding F2 via the feedback alternator section 3 acts to increase or decrease the excitation level produced by the winding F2 in accordance with variations of the load across the output terminals 4 and 5.

Owing to electromagnetic induction, any load changes across the output terminals 4 and 5 of the alternator of FIG. 1 are accompanied by an immediate change of current flow in the winding F1. That is to say, in response to load changes affecting the magnetic field due to the winding F1, current will be induced into the winding F1 having a direction such as to neutralize the change of magnetic flux. Thus, a step increase in the load across the terminals 4 and 5 promotes a step increase of the current in the winding F1. The magnitude of the change of current in the winding F1 is directly related to the change of load or power factor and simultaneously a corresponding change in the magnetic field Mr of the winding F3 and of the alternating voltage developed across the winding V are produced thereby changing the current through the winding F2 and changing the excitation required to maintain the new level of current flow through the winding F1. In this way, the required excitation for any load condition, regardless of magnitude or power factor, is generated by the feedback system of the alternator of FIG. 1.

With the brushless alternator of FIG. 1, changes of the resistance of the main field winding F1 that occur as a result of temperature changes can be compensated by appropriate changes of excitation voltage across the winding F1 to maintain the same current flow. Since the voltage developed across the main field winding F1 varies in accordance with such resistance changes, such compensation may be brought about by the provision of a second feedback winding connected as shown by the portion of FIG. 1 marked by dotted lines and denoted by the letters F4. The second feedback winding F4 is wound on the same laminations on the rotor as is the feedback winding F5 in a manner such that the magnetic field produced by the winding F4 is superimposed upon that of the winding F5. The winding F4 is connected in parallel with the series combination of the winding F1 and the winding F5. Accordingly, the flow of current through the winding F4 varies in accordance with the main field voltage and as a consequence a component of the resultant excitation current produced in the winding F2 varies in accordance with the temperature of the main field winding F1.

When a second feedback winding is provided as shown by the winding F4, correct relative proportioning of the windings F4 and F5 is important. The size of the winding F5 should predominant since the field current feedback is the most significant compensation required.

For temperature compensation, the provision of a second feedback winding such as the winding F4 is not essential. As an alternative, satisfactory temperature compensation can be provided by a proportioning of the winding V so that a larger feedback voltage is generated across the winding V thereby increasing the gain of the feedback loop. However, with such an arrangement a higher level of counteracting current will be produced by the control winding F3 at lower operating temperatures thereby reducing overall efficiency.

With the brushless alternator of FIG. 1, compensation for the increased voltage drop across the main output winding W which occurs with increase of output current may be provided by a corresponding increase of the current flow in the main field winding W. Such compensation may be achieved by design of the winding V to provide the necessary excess excitation.

In the brushless alternator so far described with reference to FIG. 1, the magnetic circuit of the feedback alternator section 3 is separate from that of the exciter section 2. However, the invention is not limited to such a construction. For instance, it is completely feasible to have a construction in which feedback section shares the same magnetic circuit as that for the exciter section. In this respect, it will be appreciated that the direction of power transfer for excitation is opposite to that for feedback. The shape of the laminations employed in the rotor and for the other parts of the common magnetic circuit will preferably be designed for efficient bi-directional transfer of power. It is also theoretically possible for all the rotary windings to be wound on a common set of laminations provided on the rotor. Such a construction is also intended to be encompassed within the scope of the present invention.

An advantage of the embodiments of the invention described with reference to FIG. 1 is that the basic structure of the brushless alternator also accommodates the main elements for regulation of the alternator output thereby reducing total manufacturing costs. In this respect, all winding operations are able to be carried out on the same machines and the same laminations are able to be used in many instances. In addition, the additional assembly time required with the known arrangements employing external regulation systems, is eliminated. A further advantage is that even though a brushless alternator in accordance with the invention requires excess excitation for stability of voltage regulation, compared with the known systems a more precise system is available for compensation of power factor, load and temperature which enables the excess excitation to be kept to a very low level thus minimizing losses and providing improved electrical efficiency.

The foregoing description in relation to FIG. 1 is based upon a design in which the voltage produced by the winding V exceeds that required to maintain the excitation current in the winding F2.

Figure 2:
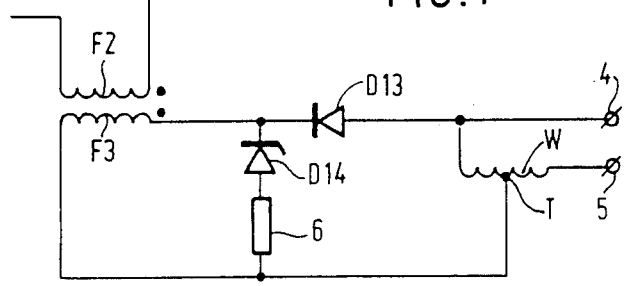
FIG. 2 is a diagram showing a variation to portion of FIG. 1 for explaining the operation of a different brushless alternator also embodying the invention.

In the alternative case of an alternator design in which the magnitude of the excitation current in the winding F2 is insufficient for build-up of the excitation current and of the alternator terminal voltage, the arrangement of FIG. 1 may be modified by the portion of FIG. 1 comprising the winding F3, the output winding W and the diodes D11 and D12 being replaced by an arrangement as depicted by FIG. 2. In FIG. 2, similar parts are denoted by similar letters or numbers. With the arrangement of FIG. 2, current from that portion of the alternator output winding W extending between the tapping T and the terminal 4 is rectified by a diode D13 and supplied as supplementary current to the winding F3 in a direction reinforcing the effects of the flow of excitation current in the winding F2. In addition, the arrangement of FIG. 2 provides a monitoring system controlling the supply of supplementary currents to the winding F3.

The winding F3 is shunted by the series combination of a zener diode D14 and a resistance 6, the characteristics of the zener diode D14, taking into account the associated circuitry, being appropriate to the terminal voltage desired across the output terminals 4 and 5. In this respect, the zener voltage of the zener diode D14 provides a reference for operation of the circuit of FIG. 2.

It will be appreciated that with an alternator according to FIG. 1 and modified in accordance with FIG. 2, during initial start up, owing to the effects of residual magnetism in the alternator a voltage is developed across the output winding W and hence across the portion of the winding between the tapping T and the terminal 4. Since the magnitude of the excitation current flow in the winding F2 is of insufficient magnitude for alternator voltage build-up, initially the voltage developed across the output winding W will not reach the desired alternator terminal voltage and the voltage developed between the tapping T and the terminal 4 will be less than the zener voltage of the diode D14. Notwithstanding, rectified current flow via the winding F3 reinforces the effects of the excitation current flowing in the winding F2 which, relative to the position of the tapping T on the winding W, should be proportioned so that the sum of the effects of current flow in the windings F2 and F3 is sufficient for alternator voltage build-up.

It is evident that with alternator voltage build-up, a stage will be reached at which the voltage developed across the portion of the winding W between the tapping T and the terminal 4 exceeds the zener voltage of the diode D14. Under such conditions, owing to breakdown of the zener diode D14, the flow of rectified current supplied by the rectifier D13 will be divided between a path provided by the winding F3 and a path provided by the series combination of the diode D14 and the resistance 6. The relative impedances of the two paths should be such that division of the rectified current between the two paths will cause the level of the alternator voltage to decay until the zener voltage is no longer exceeded whereupon the whole of the rectified current flows via the winding F3 once more and the process is repeated. Accordingly, the alternator terminal voltage developed across the output terminals 4 and 5 becomes stabilised at a desired level dictated by the characteristics of the diode D14, the value of the resistance 6 and the resistance of the winding F3.

As a variation of the basic system provided by the arrangement described in connection with FIG. 2 a source of direct current, for example a battery, may be provided in lieu of the portion of the output winding between the tapping T and the terminal 4 in combination with the rectifier D13. With such a variation, the system is no longer dependent upon the effects of residual magnetism for initial voltage build-up but suitable modification of the monitoring system of the arrangement of FIG. 2 must be made for similarly limiting the supply of reinforcing current fed to the winding F3 at a level corresponding with a predetermined level of alternator terminal voltage so that the alternator voltage is thereby stabilised in a basically similar manner.

An alternator in accordance with the invention and of the kind described in relation to FIG. 1 has the disadvantage that alternator voltage build-up may reach a dangerous level in the event of failure of the monitoring system provided by the diodes D11 and D12 or of failure of the winding F3. In comparison, an alternator of the kind described in relation to FIG. 2 may be designed so that in the event of failure, alternator voltage build-up is limited to a relatively safe level.

Many other variations of the embodiments of the invention described in relation to the brushless alternators of FIG. 1 and FIG. 2 are possible and are intended to be included within the scope of the invention.

For instance, the brushless alternator described in relation to FIG. 1 has a single-phase output winding. The principles of the invention are equally applicable to a brushless alternator equipped with two or more output windings for producing alternating voltages having a phase difference therebetween. Alternatively, the monitoring system referred to in relation to the brushless alternator of FIG. 1 and constituted by the winding F3 and the diodes D11 and D12 in combination with portion of the output winding W may be of a different form. Other methods of producing a counteracting current in response to the terminal voltage exceeding a predetermined level are known and others will be evident to persons skilled in the art, possibly eliminating the need for the winding F3 altogether, for example electronic means may be employed so as to limit the magnitude of the current in the winding F2 in accordance with the output voltage. A method in which the winding V and the winding F2 are combined is also conceivable. Likewise, variations of the reinforcing means and/or the monitoring system described in relation to the arrangement of FIG. 2 will be evident to persons skilled in the art and other methods of providing a source of counteracting current are conceivable. A brushless alternator unit employing such other methods or variation is intended to fall within the scope of the present invention.

What is claimed is:

1. A self-excited alternator of the brushless type, having a rotating field which is excited by an alternating current exciter whose rotating armature is mounted to rotate with the rotating field winding of the alternator and is permanently connected to the field winding of the alternator via field rectifier means also mounted to rotate with the field winding, characterized in that the exciter has one or more exciter stator primary windings and one or more rotary exciter secondary windings connected via rotary field rectifier means to the rotary main field winding of the alternator and, primary excitation direct current for the exciter is derived, via magnetic coupling from a rotary auxiliary magnetic field produced by a feedback winding connected in series with the main field winding and mounted to rotate therewith, by rectification of the current induced into an auxiliary stator secondary winding located within the auxiliary magnetic field, the magnetic circuit coupling the rotary feedback winding with the auxiliary stator secondary winding being common with that of the exciter.

2. A self-excited alternator as claimed in claim 1, wherein the said primary excitation current is derived by rectification of the current induced into an auxiliary stator secondary winding located within the auxiliary magnetic field, the magnetic circuit coupling the rotary feedback winding with the auxiliary stator secondary winding being common with that of the exciter.

3. A self-excited alternator as claimed in claim 2, wherein the said rotary feedback winding system is proportioned so that the magnitude of primary excitation current produced thereby is sufficient for alternator voltage build-up and wherein a cancellation means sensitive to an output voltage of the alternator is provided for cancelling the effects of excess excitation above a pre-determined voltage.

4. A self-excited alternator as claimed in claim 3, wherein the said cancellation means includes a source of counteracting current and a monitoring means for monitoring an output voltage of the alternator so that in response to the monitored output voltage exceeding a pre-determined level, a counteracting current is supplied to the exciter in a direction opposing the effects of the said primary excitation current.

5. A self-excited alternator as claimed in claim 2, wherein the said rotary feedback winding system is proportioned so that the magnitude of primary excitation current produced thereby is less than the magnitude required for alternator voltage build-up and wherein a current reinforcing means sensitive to an output voltage of the alternator is provided for supplying current reinforcing the effects of the said primary excitation current below a pre-determined alternator voltage with resultant alternator voltage build up.

6. A self-excited alternator as claimed in claim 5, wherein said current reinforcing means includes a source of supplementary current and a monitoring means for monitoring an output voltage of the alternator so that in response to the monitored output voltage being less than a pre-determined level, a supplementary current is supplied to the exciter in a direction reinforcing the effects of the said primary excitation current.

7. A self-excited alternator as claimed in claim 2, characterized in that there is provided a second rotary feedback winding which is fixed relative to the first mentioned feedback winding and located in proximity thereto so that the magnetic field produced by the second feedback winding is superimposed upon the said auxiliary magnetic field, current proportional to the main field voltage being supplied to the second feedback winding thereby providing compensation for resistance changes of the alternator main field winding resulting from temperature variation.

8. A self-excited alternator as claimed in claim 1, wherein the magnetic circuit coupling the rotary feedback winding with the auxiliary stator secondary winding is separate from that of the exciter.

9. A self-excited alternator as claimed in claim 8, wherein the said rotary feedback winding system is proportioned so that the magnitude of primary excitation current produced thereby is sufficient for alternator voltage build-up and wherein a cancellation means sensitive to an output voltage of the alternator is provided for cancelling the effects of excess excitation above a pre-determined voltage.

10. A self-excited alternator as claimed in claim 9, wherein the said cancellation means includes a source of counteracting current and a monitoring means for monitoring an output voltage of the alternator so that in response to the monitored output voltage exceeding a pre-determined level, a counteracting curent is supplied to the exciter in a direction opposing the effects of the said primary excitation current.

11. A self-excited alternator as claimed in claim 8, wherein the said rotary feedback winding system is proportioned so that the magnitude of primary excitation current produced thereby is less than the magnitude required for alternator voltage build-up and wherein a current reinforcing means sensitive to an output voltage of the alternator is provided for supplying current reinforcing the effects of the said primary excitation current below a pre-determined alternator voltage with resultant alternator voltage build up.

12. A self-excited alternator as claimed in claim 7, wherein said current reinforcing means includes a source of supplementary current and a monitoring means for monitoring an output voltage of the alternator so that in response to the monitored output voltage being less than a pre-determined level, a supplementary current is supplied to the exciter in a direction reinforcing the effects of the said primary excitation current.

13. A self-excited alternator as claimed in claim 8, characterized in that there is provided a second rotary feedback winding which is fixed relative to the first mentioned feedback winding and located in proximity thereto so that the magnetic field produced by the second feedback winding is superimposed upon the said auxiliary magnetic field, current proportional to the main field voltage being supplied to the second feedback winding thereby providing compensation for resistance changes of the alternator main field winding resulting from temperature variation.

14. A brushless self-excited alternator, comprising
a rotor comprising at leat one exciter secondary winding, an alternator main field winding, and field rectifier means connecting said exciter secondary winding to said field winding, and
a stator comprising at least one exciter primary winding magnetically coupled to said at least one exciter secondary winding, and at least one alternator output winding
characterized in that said rotor includes a feedback winding connected in series with said main field winding for producing a rotating auxiliary magnetic field, and
said stator includes a feedback secondary winding connected in a current path for one exciter primary winding and magnetically coupled to said feedback primary winding; and means for sensing output voltage from said output winding and for controlling exciter primary excitation in response to said sensing, such that exciter primary excitation current paths during alternator voltage build-up are different from exciter primary excitation current paths after build-up.

* * * * *